United States Patent [19]
Engalitcheff, Jr. et al.

[11] 3,807,145
[45] Apr. 30, 1974

[54] INJECTOR TYPE COOLING TOWER

[75] Inventors: John Engalitcheff, Jr., Gibson Island; Wilson E. Bradley, Jr., Ellicott City; Edward N. Schinner, Silver Spring, all of Md.

[73] Assignee: Baltimore Aircool Company, Inc., Jessup, Md.

[22] Filed: May 19, 1971

[21] Appl. No.: 144,853

Related U.S. Application Data

[63] Continuation-in-part of Ser. No. 869,798, Oct. 27, 1969, Pat. No. 3,767,176.

[52] U.S. Cl. .................. 55/257, 55/228, 55/229, 62/310, 62/314, 239/550, 239/557, 239/601, 261/23 R, 261/29, 261/116, 261/DIG. 11, 261/DIG. 46
[51] Int. Cl. ............................................ B01d 47/02
[58] Field of Search .................. 55/228, 229, 257; 239/428.5, 601, 550, 556, 557; 62/310, 314; 261/23 R, 29, 36 R, 116, DIG. 11, DIG. 46

[56] References Cited
UNITED STATES PATENTS

| | | | |
|---|---|---|---|
| 1,639,179 | 8/1927 | Hamel | 261/30 |
| 1,972,001 | 8/1934 | Witham, Jr. et al. | 239/601 |
| 2,066,832 | 1/1937 | Gay | 261/116 |
| 2,445,908 | 7/1948 | DeFlon et al. | 261/DIG. 11 |
| 2,732,190 | 1/1956 | Mart | 261/28 |
| 2,911,011 | 11/1959 | Niehart | 55/257 |
| 3,304,696 | 2/1967 | McKenna | 55/440 |
| 3,360,906 | 1/1968 | Parkinson | 261/DIG. 11 |
| 3,372,530 | 3/1968 | Zimmer | 261/116 |
| 3,444,670 | 5/1969 | Hungate | 55/257 |
| 3,608,274 | 9/1971 | Stingelin et al. | 261/116 |
| 1,170,308 | 2/1916 | Mertz | 55/257 |
| 3,268,217 | 8/1966 | Goiter | 261/DIG. 11 |

*Primary Examiner*—Tim R. Miles
*Assistant Examiner*—Steven H. Markowitz
*Attorney, Agent, or Firm*—Stevens, Davis, Miller & Mosher

[57] ABSTRACT

An injection cooling tower, the basic module of which is composed of a chamber having a mouth, a throat, a diffusion region and an exhaust opening. Water is injected into the throat and induces air flow into the mouth as well as mixed concurrent, generally horizontal flow in the diffusion region. Heat laden saturated air is discharged from the exhaust opening and cooled water is collected adjacent the exhaust end of the chamber.

39 Claims, 13 Drawing Figures

INVENTORS
JOHN ENGALITCHEFF, JR.,
WILSON E. BRADLEY, JR.,
EDWARD N. SCHINNER

BY
*Stevens, Davis, Miller & Mosher*
ATTORNEYS

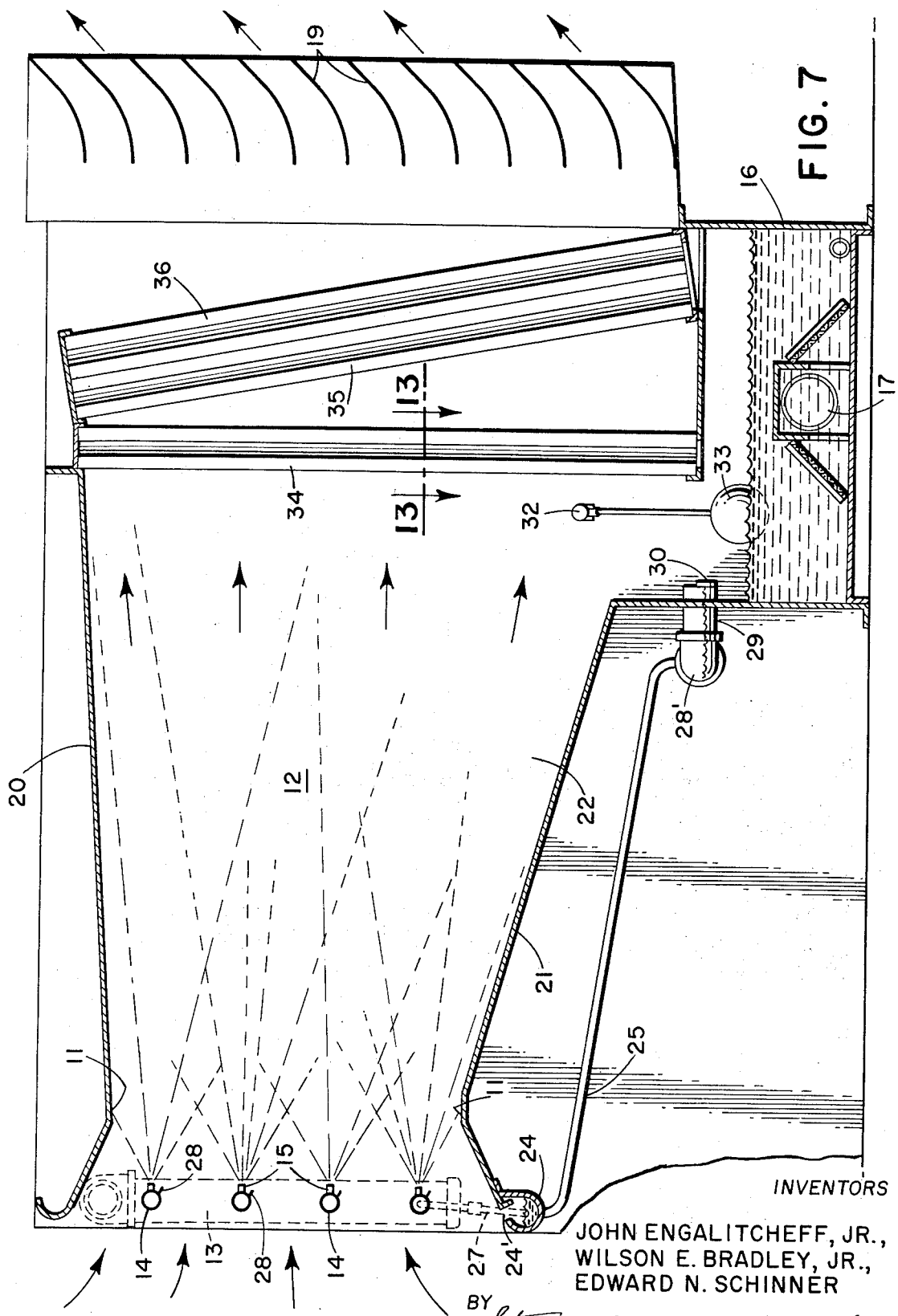

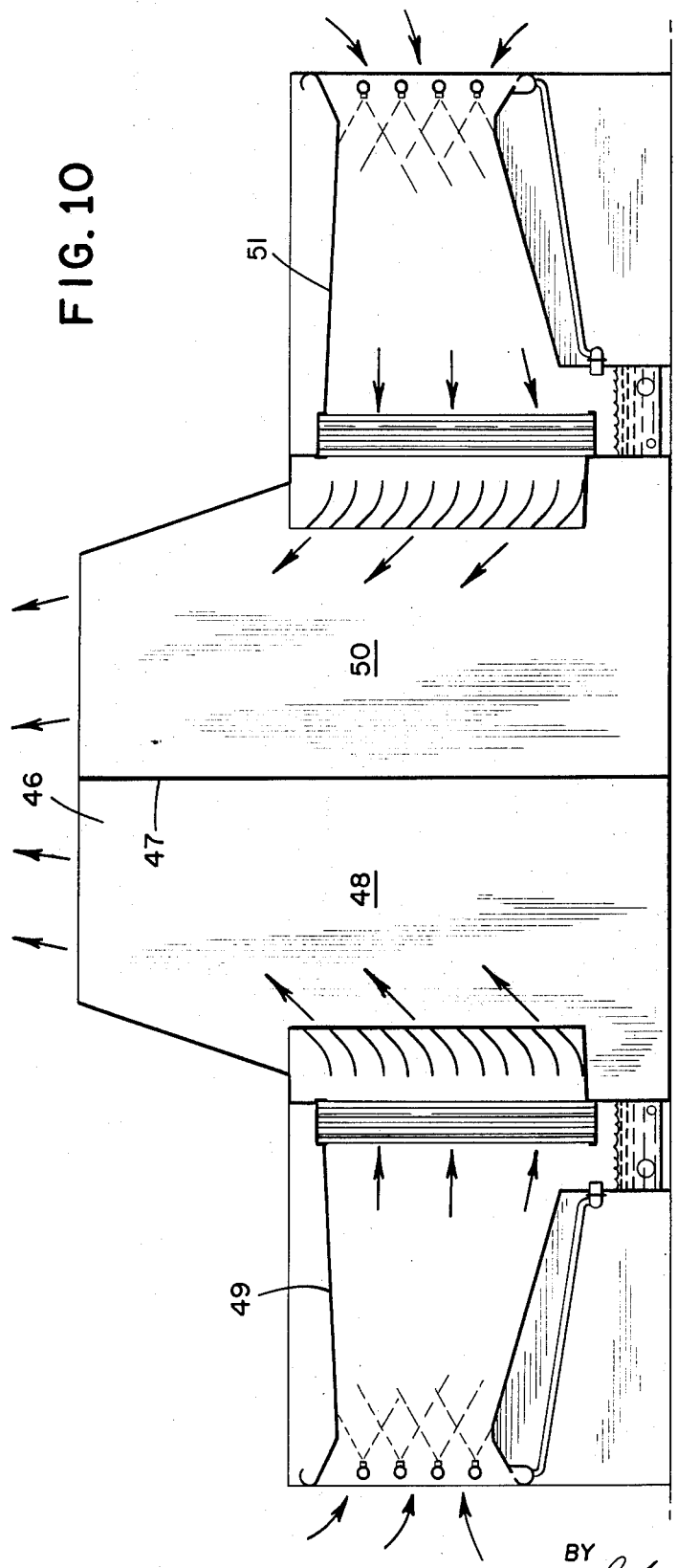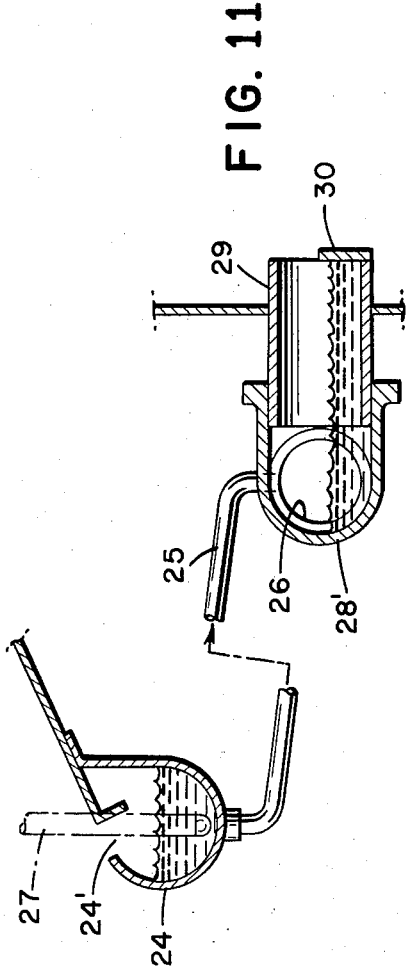

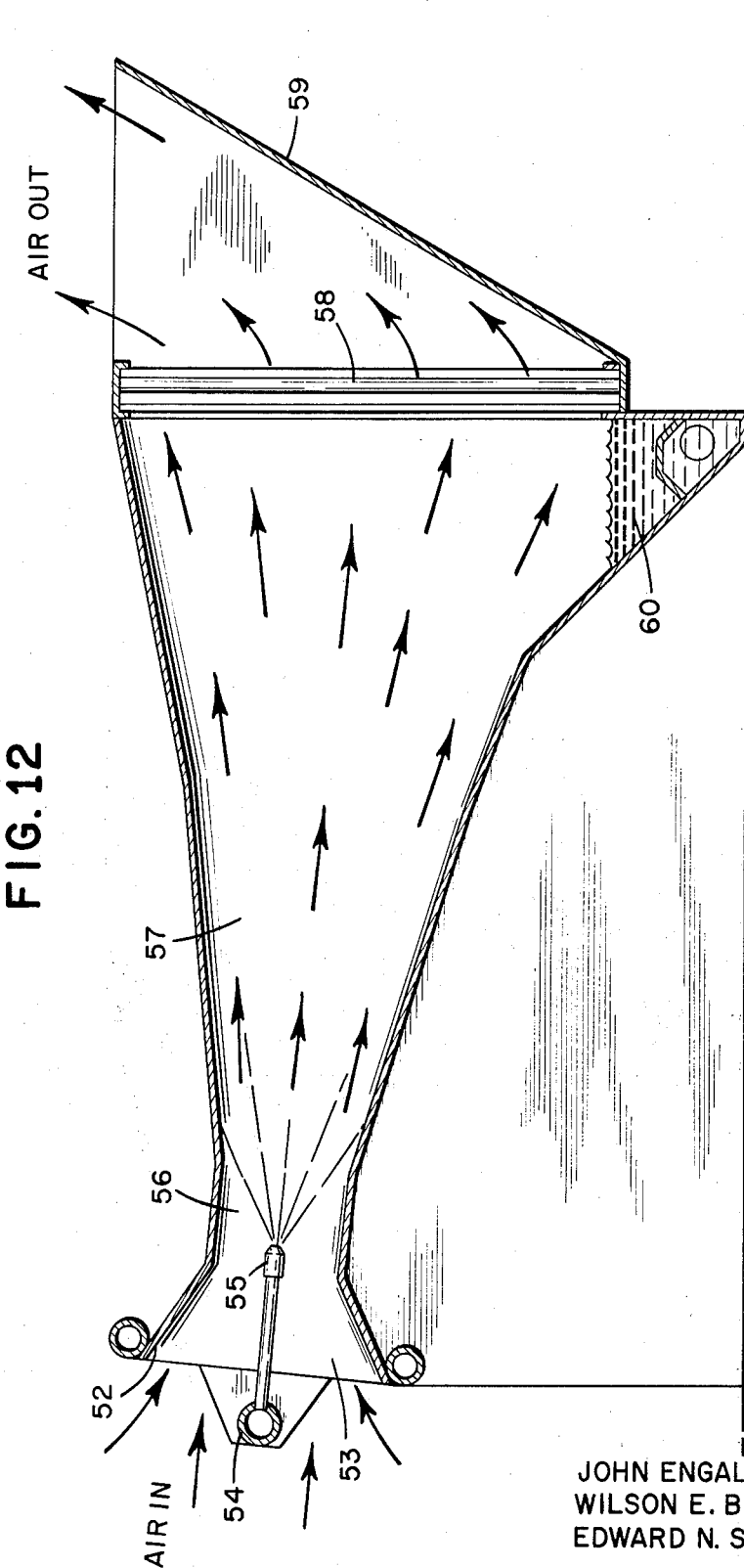

INJECTOR TYPE COOLING TOWER

This application is a continuation-in-part of application Ser. No. 869,798, filed Oct. 27, 1969, now Pat. No. 3,767,176.

This invention relates to an improved evaporative heat exchanger of the injection type in which water and air flow through a cooling tower in a generally horizontal direction to effect evapoarative cooling of the water.

In the application above identified there is disclosed the concept of a cooling tower made in the form of an injector so that the water to be cooled functions as the sole means to pump the air. In the type of construction described there is a large air-water interface and some of the water which pumps the air is evaporated, and the latent heat for this evaporation is extracted from the remainder of the water which is then collected in a sump on the exhaust side of the injector. The evaporated water saturates the air and this air bearing the extracted heat is exhausted to atmosphere.

An object of the present invention is to provide an evaporative heat exchanger of the injector type the components of which are so designed and positioned as to cause the throughput ratio of pounds of air to pounds of water to be at maximum, the relative velocity between the injected water and induced air to be large, and the area of water - air heat exchange surface to be large, thus resulting in high overall efficiency coupled with economy of construction and operation.

Although injectors have been commonly used in gas scrubbing apparatus and like applications, the present invention makes it possible to achieve a heat exchange capacity equal to or greater than that of a conventional counter-current cooling tower by a piece of apparatus far simpler to build and to maintain as well as cheaper to operate.

It has been discovered as a part of this invention that if there is an expansion zone downstream of the throat of the injector, it is advantageous to define the expansion zone with the upper and lower walls of the tower rather than with the side walls thereof; and, under such circumstances, the use of fan-shaped water sprays with the long dimension of the sprays arranged vertically has proved to be advantageous. Furthermore, because of the effect of gravity, it is desirable to define more of the expansion with the lower wall than with the upper one.

It is an object of the present invention therefore to provide an injection type cooling tower operating on a generally horizontal axis which is characterized by high thermal efficiency and low noise level.

Other objects and advantages of the present invention will be apparent upon consideration of the following detailed description of several embodiments thereof in conjunction with the annexed drawings wherein:

FIG. 7 is a view partly in side elevation and partly in section showing a mist eliminator arrangement for use with high throughputs of water and air;

FIG. 10 is a schematic view in vertical section of an injector cooling tower according to the present invention in which two basic modules are used in face-to-face relationship discharging into a common stack;

FIG. 11 is a fragmentary view in section illustrating to an enlarged scale the blow-down system of FIG. 1;

FIG. 12 is a modified injection-type cooling tower in which the spray nozzles eject water generally horizontally.

Figure 1:
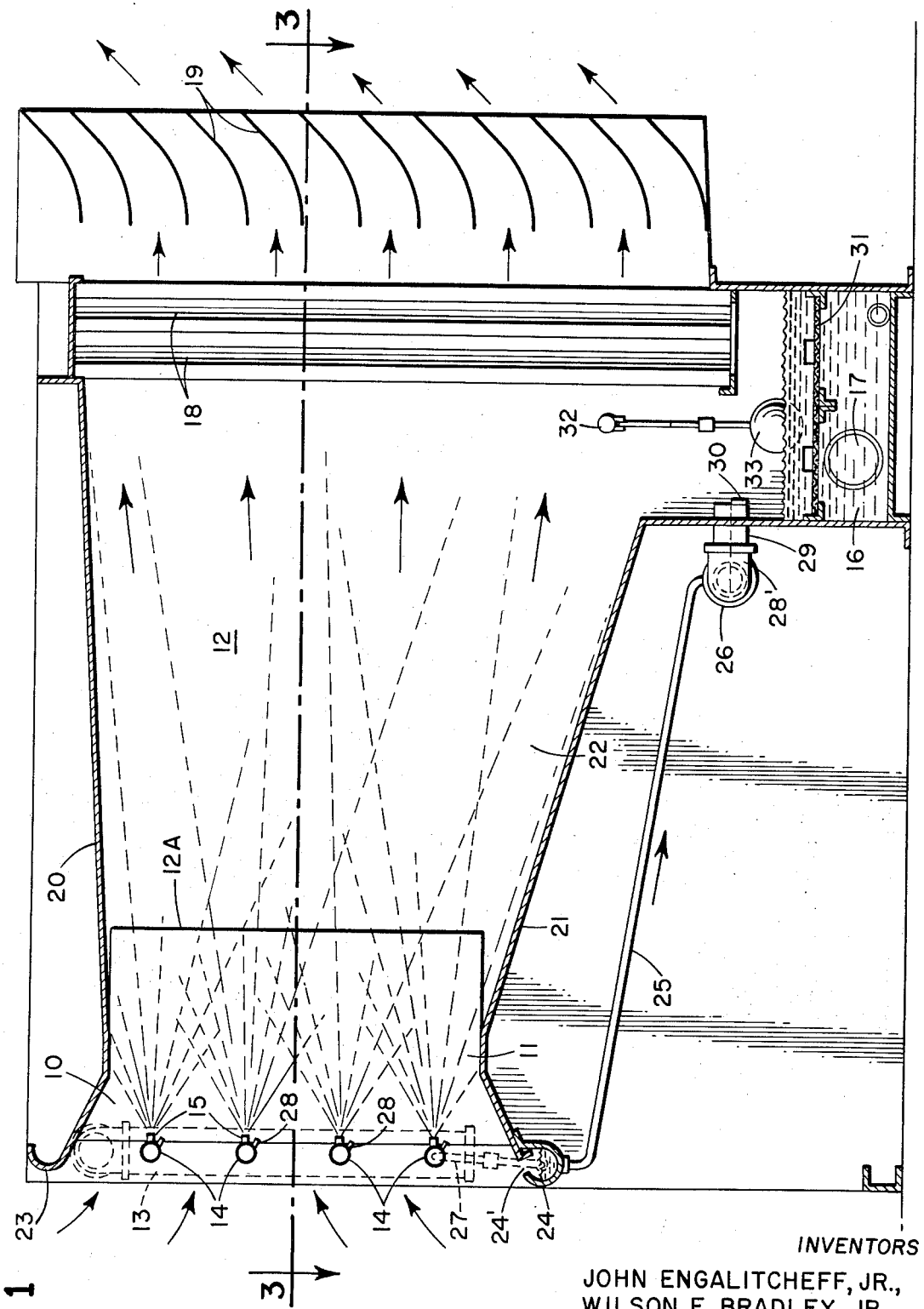
FIG. 1 is a view in transverse section of a single module of a horizontal injection type cooling tower constructed in accordance with the teachings of the present invention.

Referring to FIG. 1 in greater detail, the apparatus there shown comprises a cooling tower having an air entry mouth at 10, a throat at 11, and downstream of the throat, a diffusion or expansion region 12. Water to be cooled is supplied through a header 13 to a series of horizontal conduits 14, each provided with nozzles 15 spaced along the length of the respective conduit. Water is sprayed from the nozzles 15, and this action draws air into the mouth 10 of the apparatus. In a manner to be hereinafter more fully explained, the nozzles 15 are so spaced and the spray therefrom is of such shape that a water seal is established across the throat 11. The air which is drawn into the mouth 10 and passes through the throat 11, mixes intimately with the droplets of water. Flow continues through the diffusion region 12. Evaporative cooling takes place because some of the water is evaporated and the heat of evaporization is extracted from the remaining water, which, moving from left to right as seen in FIG. 1, falls into the sump 16 from which is is withdrawn through conduit 17 to be used. The air exhausts from the tower through a group of mist eliminators 18 which strip out any remaining water entrained thereby so that the substantially droplet free air discharging from the eliminators 18 is passed to atmosphere through turning vanes 19. These vanes cause the air to flow upwardly and away from the cooling tower to avoid recirculation of the hot discharged air to the region of the mouth 10. The turning vanes 19 also function to minimize the effect of severe cross winds opposing the air flow through the unit. Should conditions permit, these vanes may be omitted. Should conditions require it, they may be supplemented with a wind deflector such as is shown at 59 in FIG. 12.

Figure 2:
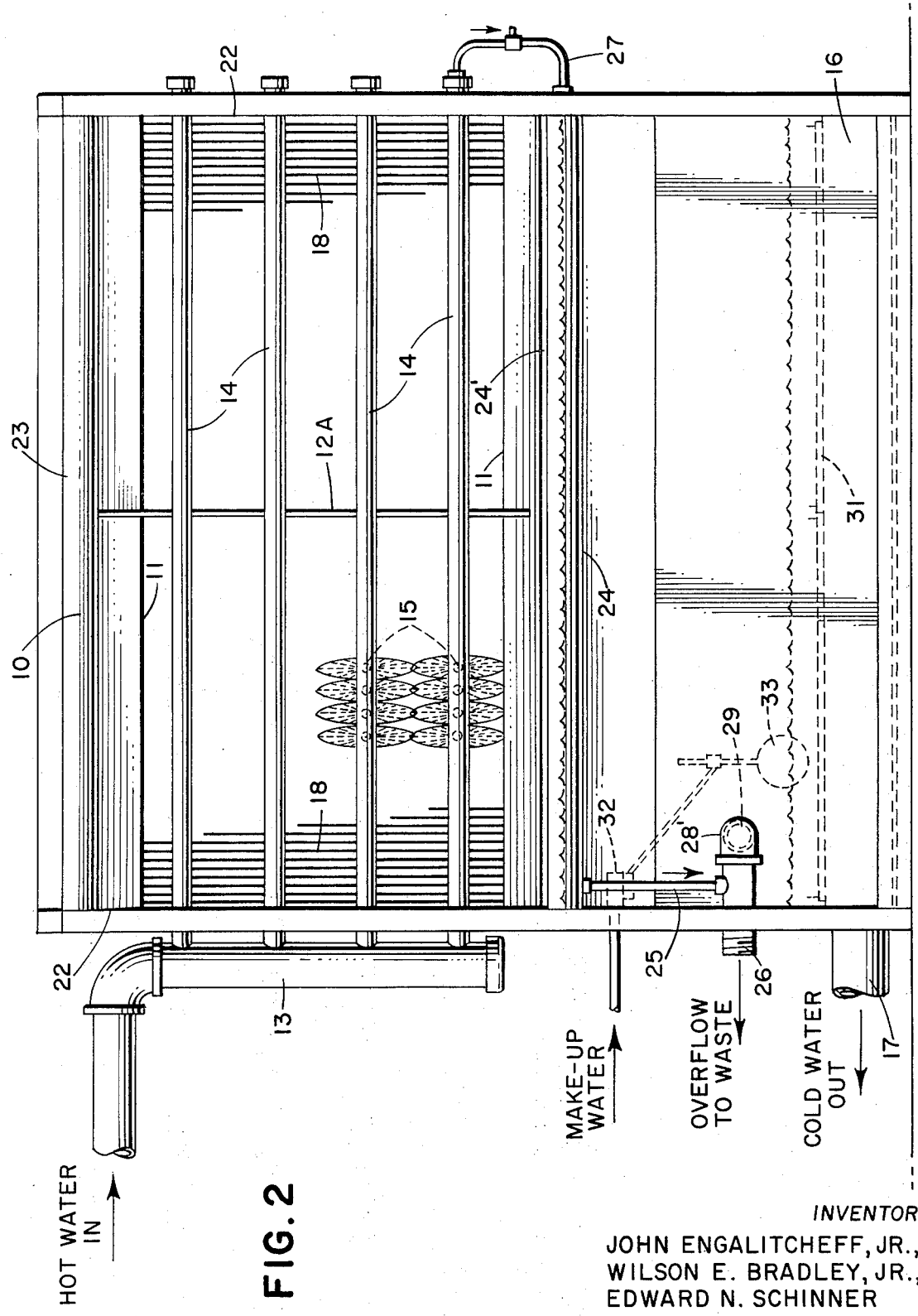
FIG. 2 is an end view of the apparatus of FIG. 1 taken from the intake end of the equipment.
Figure 3:
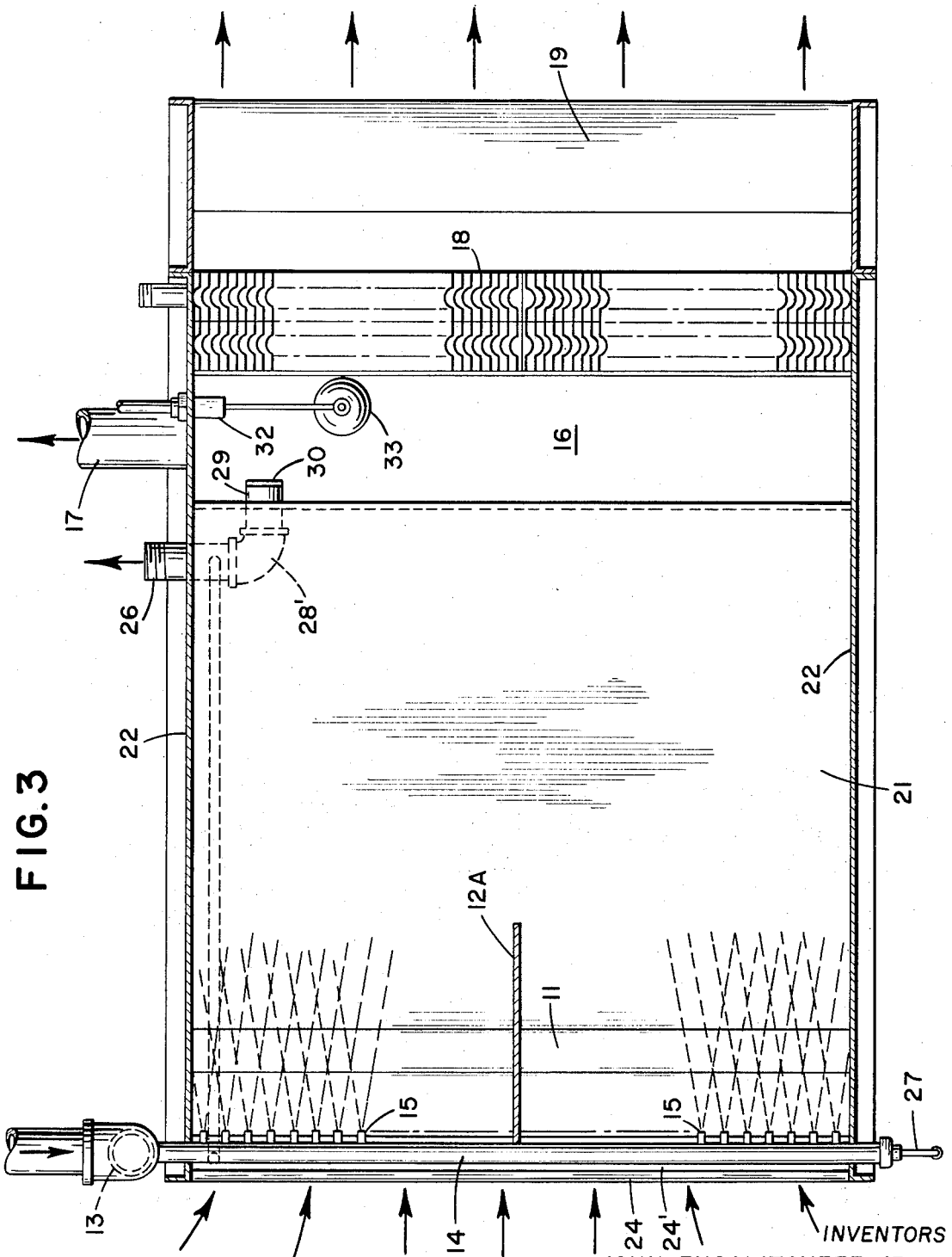
FIG. 3 is a view in horizontal section taken on line 3 — 3 of FIG. 1.

It will be noted in FIG. 1 that the upper defining wall 20 of the diffuser section 12 has a different slope from the lower defining wall 21 thereof whereas the sidewalls 22 are vertical, see FIGS. 2 and 3. This is to take advantage of the effect of gravity on the trajectory of the water streams issuing from the nozzles 15. Because of the effect of gravity, the upper expansion angle, that is, the angle between the horizontal and the upper boundary 20 of the expansion region 12 of the tower, is smaller than the lower expansion angle which is the angle between the horizontal and the lower boundary 21 of the expansion region 12 of the tower. By so disposing the walls 20 and 21 maximum efficiency for the expansion of the air - water mixture is assured as well as maximum air - water contact.

It should be noted that the entrance to the mouth 10 is arranged in bell form to reduce air resistance. The upper wall 23 at the defining edge of the mouth is curved as can be readily seen in FIG. 1. A trough 24 which defines the lower edge of the bell mouth has a narrow slit in it at 24' which runs the full width of the mouth 10 but which is sufficiently narrow as not to interfere with the entering air flow. This trough or gutter 24 is connected at the left end, as seen in FIG. 2, to a pipe 25, which is connected to a waste discharge conduit 26.

All evaporative cooling towers require some portion of the recirculating water be discharged to waste in order to prevent excessive accumulation of mineral salts. In the present construction, the lowermost nozzle supply conduit 14, again see FIG. 2, is connected by a conduit 27 to the end of the gutter 24 opposite from the end to which the gutter drain 25 is attached. This means that water discharged from the system is warm water, i.e., part of the water being supplied to the tower for cooling and that it flows across the entire bottom of the air admission mouth in order to reach the waste line. Thus, the warm water is in heat exchange relation with the metal of gutter 24 and by conduction, with adjacent metal parts. Furthermore when the tower is shut off and the water from the pipes 14 drains out, some of it falls to the region of the slot 24' in the bell mouth trough 24. To ensure that this takes place, there are small projections 28 under each of the nozzles 15, see FIGS. 1, 4 and 5. The projections 28 may be provided by a single piece of metal extending lengthwise of conduit 14, as shown, or may be provided by individual pieces under each nozzle. In either case the position and length will be chosen to avoid interference with the incoming air flow. These projections 28 function to prevent water from falling outside of the mouth 10 so that ultimately drippage from the nozzles is received somewhere along the length of the slot 24'.

In winter, during shut off or operation, any water drippage entering the slot 24' is prevented from freezing because of the heat of the blow-down water which is passing through conduit 27 through the bell mouth piece 24 to waste conduits 25 and 26. This warm bleed water then prevents freezing when the header water is draining off after shut off. The quantity of water needed to prevent ice formation is very small and may, if desired, be discharged into the sump, without materially affecting the capacity of the tower. The heat exchange effect of the blow-down water in gutter 24 is, of course, valuable in winter weather even when the header is not draining after shut off because it keeps the lower part of the throat warm and prevents ice formation.

In addition to the features heretofore described it is to be noted that discharge conduit 26 is connected by an elbow 28' to a short conduit 29 which protrudes into the sump area above the level of the water. This short conduit 29 is provided with a dam 30 at one end, the dam being of sufficient height so that water coming from line 25 will not overflow it but, should there be a malfunction in the water level control or stoppage in the main cold water outlet 17, a drain for discharging overflowing sump water is provided. These details are shown in FIG. 11.

The sump is provided with the usual strainer screen 31 and with a make-up water spigot 32 controlled by a float 33 in the conventional manner, that is to say, when the water level falls below a pre-determined value the sinking of float 33 opens a spigot 32 and adds make-up water to the system.

In FIGS. 1, 2 and 3 there is shown a baffle 12a which is used with units of considerable width to prevent cross flowing wind from displacing mist-like droplets of water so that they escape from the air entry end of the unit. While a single baffle is shown, it is intended that the number used be a function of unit width. The baffle 12a extends from a plane tangent to the conduits 14 to somewhat beyond the throat 11, see FIG. 1.

Figure 4:
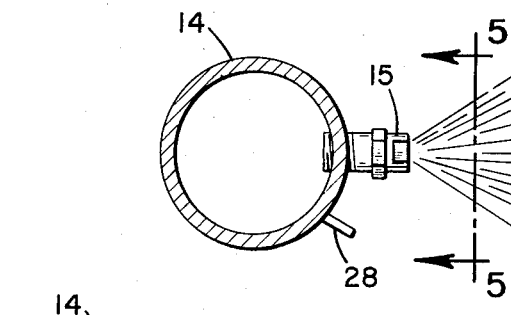
FIG. 4 is a view partly in section and partly in side elevation of a single water spray nozzle of the type employed in the present invention showing the spray pattern as seen from the side.
Figure 5:
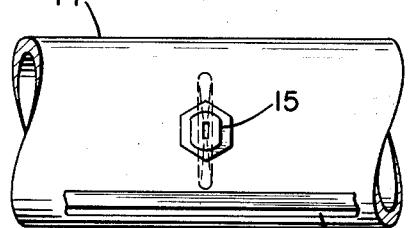
FIG. 5 is a view in cross section on the line 5 — 5 of FIG. 4 to show the cross-sectional shape of the spray as it appears close to the nozzle.
Figure 6:
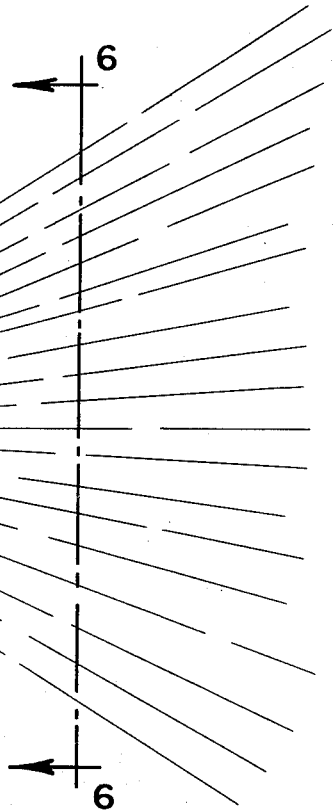
FIG. 6 is a view in section taken on the line 6 — 6 of FIG. 4 to show the cross section of the spray as it appears near the throat of the injector.

If now reference is made to FIGS. 4, 5 and 6, the construction and function of the various nozzles 15 can be better understood. The discharge opening of each nozzle 15 is such as to produce a spray having, as viewed from the side, the shape illustrated in FIG. 4 and as viewed in section the shapes illustrated in FIGS. 5 and 6. The pipes 14 are so spaced vertically from one another that the upper and lower edges of each spray intersect just about in the throat 11. The nozzles 15 are so spaced in relation to one another along the respective pipes 14 that the side edges of the spray just about touch one another in the throat. See in this regard FIG. 2. Thus, it is that air which is drawn into the mouth 10 of the tower flows in between the various water jets but the seal formed in the throat 11 is so complete that there is no tendency for blow-back of air in normal conditions of operation.

Water spray issuing from any nozzle orifice will expand to some degree in all directions downstream of the nozzle. The amount of expansion in certain directions can be controlled by the design of the orifice. It has been discovered that maximum usage of input energy to pump air in an injector cooling tower is importantly related to the nozzle orifice and the orientation of the nozzles in relation to one another and in relation to the other parts of the cooling tower. Thus, it is an advantage of the present invention that the expansion of the jets of water is principally in vertical planes since this corresponds to the expansion in the diffusion zone which is brought about by the slope of walls 20 and 21 which define the upper and lower boundaries of the diffuser. One desirable nozzle disposition is four rows of closely spaces nozzles each of which produces a high velocity, highly atomized spray in fan-shaped pattern. Several features of the design of the nozzle contribute significantly to the air aspiration and the heat transfer action. The spray patterns present at the exit of the nozzles, see FIG. 5, are thin sheets of water which have considerable surface area to transfer momentum to the air to start its movement into the throat, yet which present, at the same time, streamlined profiles for air entry. The spray pattern as illustrated in the drawings has also the advantage that it permits filling a rectangular throat such as is shown in FIG. 2 without wasting water and energy on the side walls or from the excessive overlapping which would be necessary to produce a seal using conical sprays.

Of course, the nozzles 15 are directed generally horizontally toward the discharge end of the tower so that the major thrust of the water is in the direction that the air is to be moved. Yet, any spray issuing from a nozzle must expand to some extent downstream of the nozzle which produces it. The lateral displacement of water from the flat sides of the sprays is small and in fact is just enough to form a seal between the closely spaced adjacent sprays. The nozzles are such as to limit the sprays in this fashion because any more lateral movement of the water would be wasteful of energy as the forward rather than the lateral movement of the water functions to pump air through the unit. The angle of expansion of the water spray issuing from the nozzles in vertical planes is much greater than the lateral expansion of the sprays. This is desirable because it helps to expand the air - water mixture into the diffusion region which is defined by walls 20 and 21 diverging in the same general direction as the vertical expansion of the sprays. The end result is that the input water energy is directed primarily toward the mixt eliminators 18. This, of course, is the optimum pumping direction. In addition, the other needs of the ejector, such as good air diffusion and streamlining, are met. Thus, the pumping energy put into the water is used to a maximum extent to bring about aspiration of air and entrainment thereof through the apparatus and also to achieve excellent air - water contact and mixing for maximum heat transfer. The efficiency of the air pumping action is appreciated when the quantity of air pumped is considered. Approximately three times the quantity of air is used to achieve the same degree of heat transfer as would be necessary in a conventional counterflow tower. Even with the large increase in required air flow which results in high internal air velocities, this necessary amount of air is pumped with an input energy which is less than that required in many counterflow towers.

In conventional cooling towers, different capacities may be obtained from a given module plan area by changing the amount of wet-deck fill or varying the air quantity through the tower by adjusting the fan speed. Capacity adjustment is obtained in an ejector tower simply by variations in the nozzle sizes to obtain different operating spray pressures. The nozzle pressure determines the quantity of air flow and the degree of air - water contact and hence the amount of heat transfer available. The higher the water pressure is raised the greater is the input energy and hence the greater the amount of air pumped. This in turn makes for finer spray and mixing and heat transfer.

The high flow rate of the air and water makes the job of the mist eliminators very difficult. In FIG. 1, there are shown two sets of mist eliminators 18 which are used for what may be called average water flow rates and pressures. In some applications where the nozzle pressure is very low or the water flow rate is less than average a single bank of mist eliminators can function to strip the water droplets from the air. Most often, however, the velocities through the tower are in excess of the capabilities of a single bank eliminator adequately to strip all water from the air. In addition, the velocity of the water leaving the nozzles is very high and impinges on the first set of blades in large quantities. Therefore, the first deck, and a large portion of the second, are completely wetted further to function as conventional wetdeck surface significantly to contribute to the heat transfer in cooling the water and achieve very close approaches between the leaving water temperature and the leaving air temperature. This, of course, is very important in order to obtain maximum heat transfer efficiency particularly with a parallel flow heat exchanger.

Figure 13:
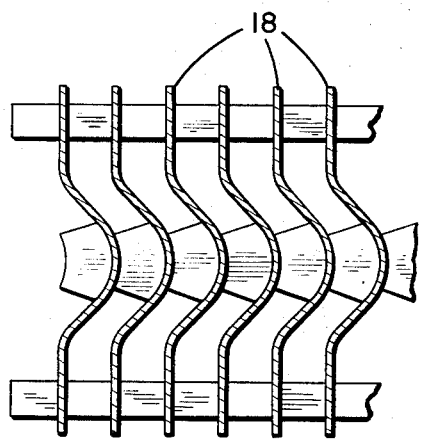
FIg. 13 is a fragmentary view in section of the mist eliminators shown in FIGS. 1 and 3.

The shape of the eliminators is appreciated from reference to FIGS. 3 and 13. These are the same construction as is shown in application Ser. No. 838,014, filed june 17, 1969.

The illustrated configuration provides a very effective eliminator with a very low air resistance as compared to conventional sharp break mist eliminators. Because the eliminator is wet, the surfaces function also as wet-deck. Both of these features importantly contribute to the thermal efficiency of the apparatus. Note that the eliminators are so mounted as to leave the bottom edges open for free discharge of water into the sump 16, see FIG. 1.

Under temperature conditions that permit very large quantities of water to be used, it may be that two units of mist eliminators such as are shown in FIG. 3 will not be adequate to strip the entrained water from the airstream. It should be noted that as the water rate is increased the energy input is proportionally increased thereby resulting in a significantly higher air flow rate as well. An arrangement for handling large volumes of water is shown in FIG. 7. This figure illustrates an injection type cooling tower basically similar to that shown in FIG. 1 except for the mist eliminators. In FIG. 7 there are three banks of mist eliminators 34, 35 and 36. In cross section each of these is of the same shape as is shown in FIG. 13. Because of the effect of gravity on the flowing water in the diffusion zone 12, it is evident that by the time the water is in the region of the mist eliminators there is more water per unit volume near the bottom of the tower than at the top. Even so, the velocity of the water at the time it reaches the first eliminator 34 is such that if that eliminator were used alone a considerable volume of water would go through it but would thereafter assume a trajectory with a much larger gravity component. To prevent the velocity of the water from driving some of it even through three banks of eliminators, banks 35 and 36 are disposed at an angle to the vertical such as to define a space triangular in vertical section between the first bank of eliminators 34 on the one hand and the second and third on the other. Thus water which passes through eliminator 34 is considerably decelerated as it enters eliminators 35 and 36. The combined effect of gravity and the sloping eliminator channels is to provide a path to the sump through which the remaining component of horizontal energy in the water is dissipated so that the water will fall for recovery into the sump.

It is important to note that the mist eliminators 34, 35 and 36 are made of long strips having straight edges connected by a curved central portion and are thus of the same shape as eliminators 18. Again see FIG. 13. These are nested also as shown in FIG. 13. In the position of the mist eliminators shown in FIG. 7 a great deal of water actually channels vertically downwardly through the mist eliminators. There is so much water, however, that even three banks would not be adequate in the situation of FIG. 7 if it were not for the fact that space is allowed between bank of eliminators 34 and banks 35 and 36. Great quantities of water fall in this region such that the water flowing from the channels of bank 36 actually represents the last of the entrained water so that mist elimination is complete.

These eliminators, of course, function as fill in the ordinary sense that fill is used in cooling towers. The mist eliminators shown in FIG. 1 also so function, and it has been found that this fill contributes very importantly to the efficiency of the unit.

Figure 8:
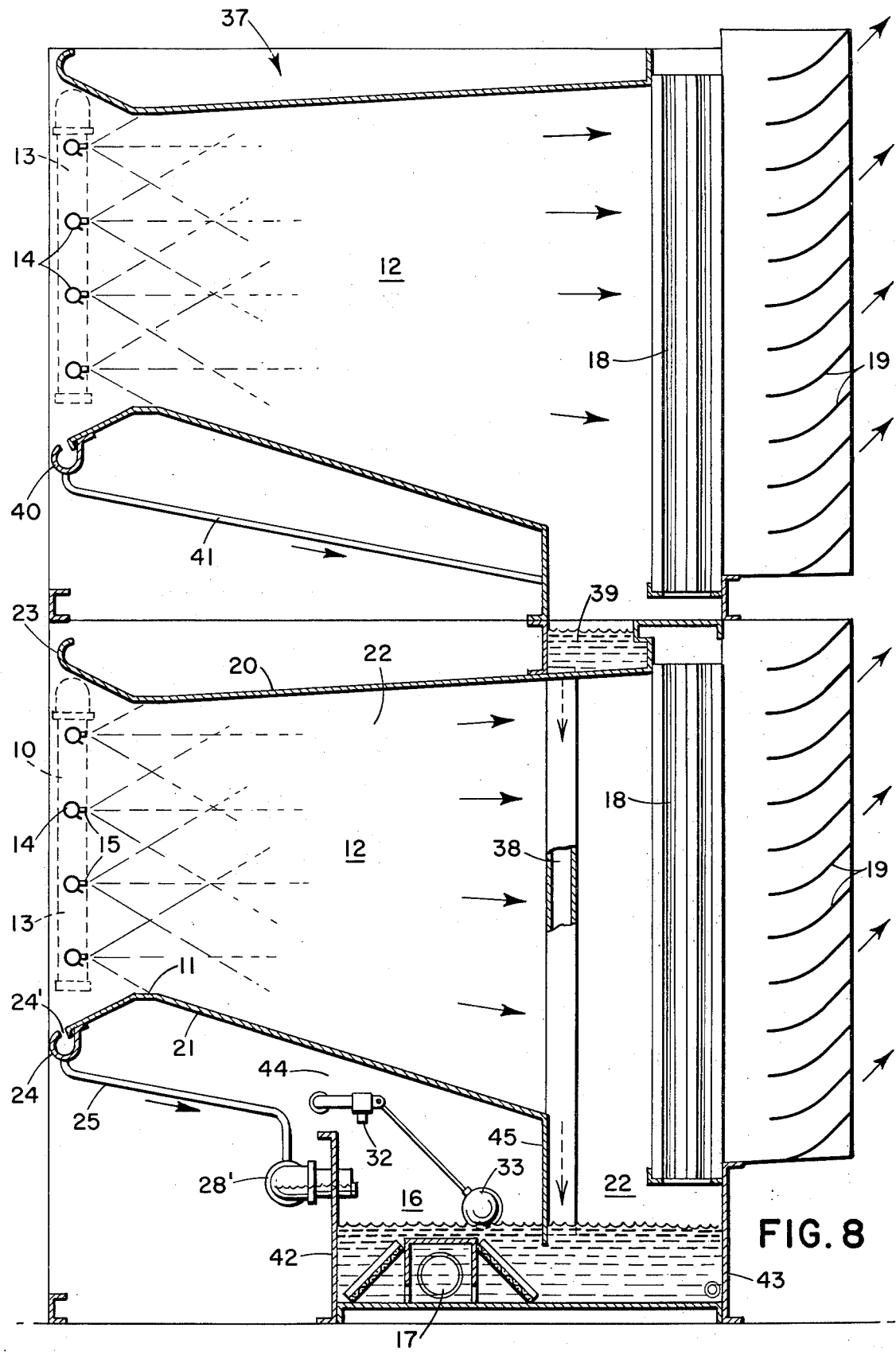
FIG. 8 is a view partly in section and partly in side elevation of an injector cooling tower according to the present invention in which two basic modules are used one above the other.
Figure 9:
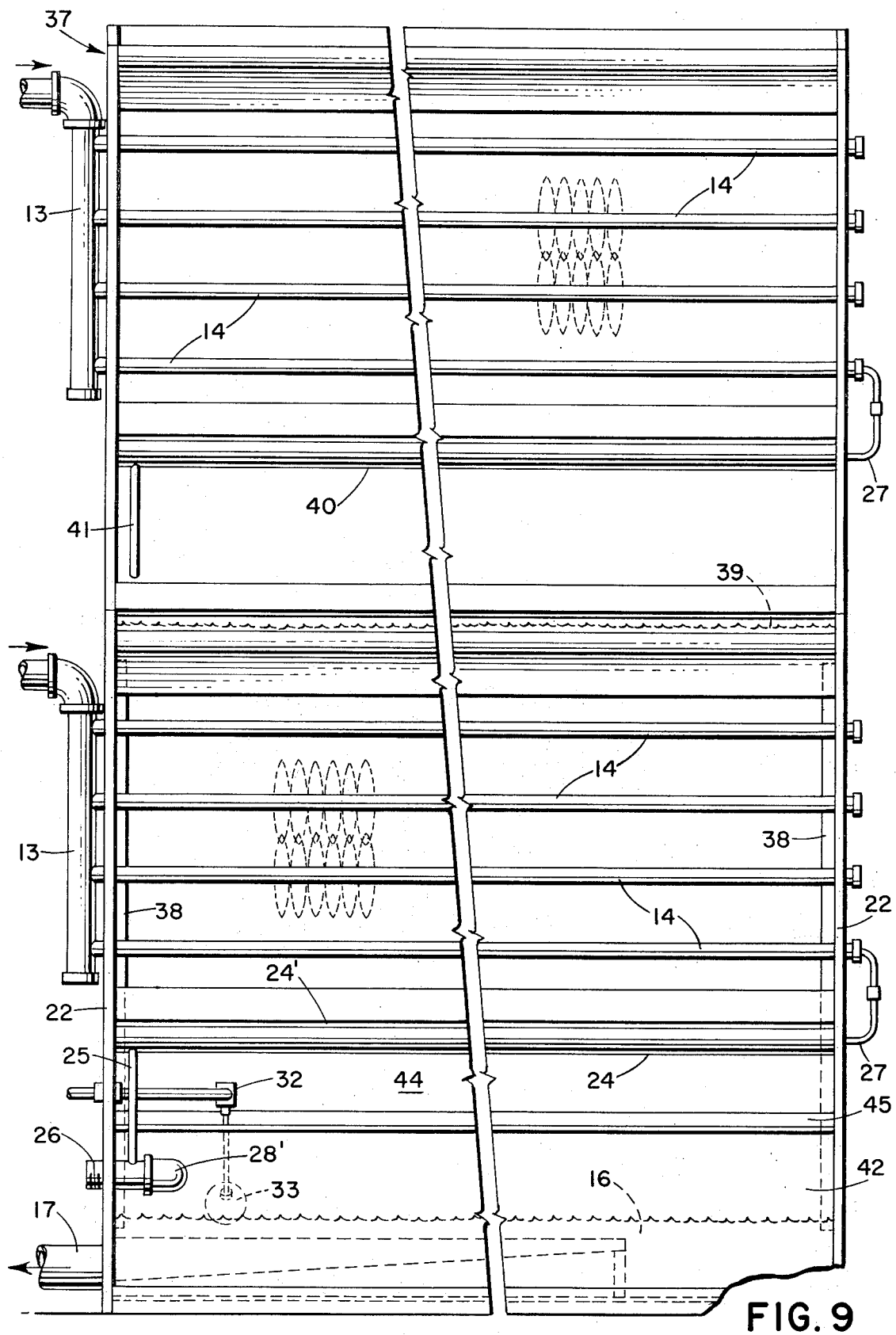
FIG. 9 is a view in elevation taken at the air inlet end of the apparatus of FIG. 8.

The basic units which have been heretofore described may be arranged in various ways to work with one another where the load requirements are such as to require a multiple unit. One way that the units may be combined is shown in FIGS. 8 and 9. In this instance the lower unit is basically similar to the unit of FIG. 1. Another unit 37 similar to it is placed above it and pipes 38 are arranged along the opposite side walls 22 of the region above the sump 16 for connecting a small sump 39 with sump 16 therebelow. The small sump 39 functions with the upper unit but is structurally a part of the lower one.

Another difference between the upper unit of FIGS. 8 and 9 and the basic module of FIG. 1 is that the trough 40 at the lower bell mouth of the upper unit, although it is similar in structure and function to trough 24, discharges differently. It is fed from the hot water line 14 feeding the lowest row of nozzles but, instead of discharging to waste, it discharges through a pipe 41 into the upper sump 39, the amount of water not being enough materially to affect efficiency. The blowdown for the system is the same as that shown in FIG. 1 associated in FIG. 8 with the lower of the two units. The sump water level control shown in the lower unit of FIGS. 8 and 9 is differently positioned from the arrangement shown in FIG. 1. In FIGS. 8 and 9 the sump is defined by two end walls 42 and 43 as well as side walls 22. The upper edge of end wall 42 is spaced below the bottom 21 of the diffusion region 12 thus defining an access space at 44. A partition 45 extends from wall 21 with its lower edge below the normal water level of the sump. The float 33 and the spigot 32 are located between the partition 45 and the end wall 42. Since the wet region of the cooling tower is above the wall 21 and to the right of partition 45 as seen in FIG. 8, an operator may adjust the float system without getting wet even though the tower is operating. He simply reaches through access space 44 and makes the necessary adjustments. The strainer screens are also accessible through access space 44. Except for the differences in the location of the make-up water controls, the blowdown and the interconnection of the sump, the upper unit 37 of FIGS. 8 and 9 is the same as the lower unit which in turn is the same as the unit shown in FIG. 1. The construction of the lower unit of FIGS. 8 and 9 may, if desired, be used alone in lieu of the FIG. 1 arrangement.

Like reference numerals have been used throughout to identify like parts. It is, of course, understood that the advantage of having a connection between sump 39 and sump 16 is that the recirculation through a heat load to the spray nozzles takes place from the lower sump only.

Instead of the arrangement of FIGS. 8 and 9, it is also possible to face two units such as are shown in FIG. 1 toward one another or radially arranged around a central stack. This is shown by way of example in FIG. 10 where there is a tapering air discharge stack 46 having a partition 47 dividing it into a left side 48 serving a unit 49 such as is shown in FIG. 1 and a right side 50 serving a unit 51 such as is shown in FIG. 1.

FIG. 12 of this application was FIG. 7 of application Ser. No. 869,798. That figure is described in said application as follows.

In FIG. 12 a horizontal water flow arrangement is depicted. There is a flared mouth portion 52 defining a rectangular air inlet at 53, the short dimension of which is shown in FIG. 12. Lengthwise of the air inlet at 49 there extends a water supply pipe 54 from which there extend a line of mutually spaced nozzles 55 arranged centrally of the ejector walls. The ejector also includes a throat portion 56 of rectangular cross section and a diffuser portion 57. The outlet end of the diffuser is provided with mist eliminators 58 and with a wind deflector 59 to prevent natural air currents from opposing the left to right air flow through the ejector as illustrated.

The ejector pictured in FIG. 12 is tilted downwardly at a slight angle in the direction of flow to prevent water from running out of the throat down the inlet and dripping to the floor. The water - air mixture entering the diffuser maintains enough directional energy to expand fully and fill the upper section of the diffuser even though this requires the mixture to travel "uphill."

In the system of FIG. 12 the cooled water is recovered in a sump 60 which forms part of the lower wall of the diffuser portion 57. The usual water make-up and withdrawal systems are included but not illustrated.

The term injector as used in the claims hereof is intended to define the pumping of air by water jets regardless of whether or not the throat is restricted.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An evaporative heat exchanger for cooling water with atmospheric air, said heat exchanger comprising an injector formed in the shape of a conduit defining a flow path extending along a generally horizontal flow axis and comprising an intake region, an intermediate region and an exhaust region arranged serially along said flow path with said intake and exhaust regions both being open to the atmosphere, water spray means configured and arranged to inject into said intake region and along said flow path, a high velocity spray of water of such shape and configuration as to produce an air pumping action through said conduit and an effective water seal across said conduit to prevent blow-back of air therefrom while maintaining a high relative velocity between the injected water and the induced air, a water container disposed below said conduit, and mist eliminator means comprising a plurality of psaced apart strips distributed across said flow path downstream of said water spray means, each of said strips extending downwardly toward said water container, said mist eliminator means being positioned and configured to intercept the water spray and to increase the relative gravity component of its trajectory whereby a major portion of the thus-sprayed water impinges against the mist eliminator means and is channeled downwardly to said water container, the surfaces of said mist eliminator means thereby serving as wet-deck to maximize heat transfer.

2. An evaporative heat exchanger as claimed in claim 1 in which the cross section of the injector is rectangular and the means to spray water comprises at least one row of nozzles.

3. An evaporative heat exchanger as claimed in claim 2 wherein said nozzles are positioned and arranged to spray closely spaced jets of water in a given direction along said flow axis in a manner such that said jets touch each other downstream of said nozzles as they move in said given direction, said jets being of thin sheet configuration, to present streamlined profiles to air entering said intake region.

4. An evaporative heat exchanger as claimed in claim 3 wherein said nozzles are distributed along parallel rows and oriented such that the wider sides of said jets are parallel to one side of said injector.

5. An evaporative heat exchanger according to claim 1, wherein said injector is one of a plurality of similar injectors whose exhaust regions open to the atmosphere via a common stack in different radii thereof.

6. An evaporative heat exchanger as claimed in claim 5 further comprising louvers at said air exhaust openings to direct exhausting air upwardly in said stack.

7. An evaporative heat exchanger as claimed in claim 5 further comprising partition means to isolate the respective exhaust openings from one another at the entry to said stack.

8. An evaporative heat exchanger according to claim 1, wherein said exhaust region includes baffle means positioned downstream of said mist eliminator means and in the path of said horizontal flow axis, said baffle means being positioned to deflect exhaust air upwardly into the atmosphere.

9. An evaporative heat exchanger according to claim 1, wherein said intake region includes drip collection means in gravity registry with said nozzle means to catch the drip therefrom when the spray from said nozzle means is shut off.

10. An evaporative heat exchanger according to claim 1, whrein said intake region includes a vertically disposed baffle extending downstream of said nozzle means to protect the intake region from cross winds.

11. An evaporative heat exchanger according to claim 1, wherein said mist eliminator means comprises a plurality of spaced apart strips extending down toward said water container.

12. An evaporative heat exchanger as claimed in claim 1 in which the mist eliminator means is a stacked group of pieces lying in substantially parallel spaced relationship, each piece being an elongated strip having a flat margin portion along a long edge and a curved central portion.

13. An evaporative heat exchanger as claimed in claim 1 in which said intermediate region is of generally rectangular cross section.

14. An evaporative heat exchanger according to claim 1, wherein said mist eliminator means comprises stacked groups of pieces lying in substantially parallel relationship, each piece being an elongated strip having flat margin portions along its long edges interconnected by a curved central portion, at least one group of pieces being disposed generally normal to the horizontal and at least one other group defining with said normally disposed group a space, said second mentioned group being spaced downstream of the first mentioned group.

15. An evaporative heat exchanger comprising an injector having an intake region, an intermediate mixing region and an exhaust region disposed along and defining a flow path through said injector, said intake and exhaust regions open to the atmosphere, water spray means arranged to spray water into said injector, said water spray means comprising a plurality of spaced apart nozzle means capable of injecting jets of water in a given direction into said injector along said flow path in thin sheet configuration, said nozzle means being positioned such that adjacent jets therefrom touch each other downstream of said nozzle means as they move in said given direction, said jets being positioned and arranged by said nozzle means to present streamlined profiles to air entering said intake region and to permit said entering air to flow in said given direction directly in between the jets upon entering so that a large surface area is presented to air surrounding each jet thereby to induce maximum air flow in said given direction through said injector and to mix with said jets, and a water container in communication with said injector, downstream of said water spray means, to receive water which separates from the air flowing through said injector.

16. An evaporative heat exchanger according to claim 15 wherein said nozzle means is operative to produce high velocity highly atomized sprays.

17. An evaporative heat exchanger according to claim 15, wherein said nozzle means is of a size and arrangement capable of distributing said spray of water throughout the cross section of said injector to form a water seal therein.

18. An evaporative heat exchanger according to claim 15, wherein said nozzle means comprises a plurality of nozzles arranged to eject water sprays of thin sheet configuration which are parallel to each other.

19. An evaporative heat exchanger according to claim 18, wherein said nozzles are positioned in side-by-side relationship and are aimed to direct said water sprays in a manner such that they intersect to complete a pressure seal within said conduit with minimum overlap of sprays from adjacent nozzles upstream of said pressure seal.

20. An evaporative heat exchanger as claimed in claim 15, wherein mist eliminators are disposed in the flow path between said spray ejection means and said water container, the location and contouring of said mist eliminators being such as to cause them to maintain a film of water thereon during operation as well as preventing of water droplets from issuing from said stack.

21. An evaporative heat exchanger as claimed in claim 15, wherein the cross-section of the conduit is rectangular and means to eject the sprays are nozzles, said nozzles being disposed in rows parallel to the axis of the long dimension of the conduit cross section, the spacing between said rows and the disposition of nozzles along each row being such as to cause the long axes of adjacent spray patterns in different rows to lie in alignment.

22. An evaporative heat exchanger comprising an injector having an intake region, an intermediate mixing region and an exhaust region disposed along and defining a flow path through said injector, said intake and exhaust regions open to the atmosphere, water spray means arranged to spray water into said injector, said water spray means comprising a plurality of spaced apart nozzle means capable of injecting jets of water in a given direction in said injector along said flow path in thin sheet configuration, said nozzle means being positioned such that adjacent jets therefrom touch each other downstream of said nozzle means as they move in said given direction, said jets being positioned and arranged by said nozzle means to present streamlined profiles to air entering said intake region and to permit said entering air to flow in said given direction directly in between the jets upon entering so that a large surface area is presented to air surrounding each jet thereby to induce maximum air flow through said injector and to mix with said jets a water container in communication with said injector, downstream of said water spray means and mist eliminator means disposed along said flow path and above said water container to strip water from the air and direct it into the water container.

23. An evaporative heat exchanger according to claim 22, wherein said mist eliminator means comprises substantially parallel spaced apart strips extending across said flow path downstream of said water spray means, said strips being positioned and configured to intercept the sprayed water and to increase the relative gravity component of its trajectory whereby substantially all of the thus-sprayed water is channeled downwardly to said water container, the surfaces of said strips thereby serving as wet-deck to maximize heat transfer.

24. An evaporative heat exchanger according to claim 23, wherein said nozzle means is of a size and arrangement capable of distributing said spray of water throughout the cross section of said injector to form a water seal therein.

25. An evaporative heat exchanger comprising an injector of rectangular cross section with an inlet and an outlet open to the atmosphere, means to eject a plurality of spaced apart fan-shaped oval section spray jets of water in a given direction into said injector, the flat sides of said spray jets being normal to one defining side of the rectangle and parallel to the other, said means being positioned such that adjacent jets therefrom touch each other downstream of said means as they move in said given direction said spray jets being positioned and arranged by said means to present streamlined profiles to air entering said injector and to permit said entering air to flow in said given direction directly in between the spray jets upon entering so that a large surface area is presented to air surrounding each spray jet thereby to induce maximum air flow through said injector and to mix with said jets.

26. An evaporative heat exchanger as claimed in claim 25 in which the side to which the long axis of the fan-shaped sprays of water is parallel is shorter than the other side.

27. A method of cooling water comprising the steps of spraying water along a given direction at high velocity in a plurality of adjacent spaced apart concurrent jets, each of a generally flat sheet-like spray configuration and directing said jets into a conduit open at both ends to the atmosphere while maintaining the jets positioned and oriented to present streamline profiles to air entering said intake region and to permit said entering air to flow in said given direction directly in between the jets upon entering so that a large surface area is presented to air surrounding each jet and causing the sprays from adjacent jets to touch each other as they move in said given direction, thereby to aspirate air into and through said conduit to pass through said jets and mix with said water and extract heat therefrom inside said conduit and thereafter separating the sprayed water from said air and ejecting said air from said conduit.

28. A method according to claim 27 said spraying is done in a manner to produce high velocity highly atomized jets.

29. A method according to claim 27, wherein said sprays are parallel to each other and are directed so that adjacent sprays intersect each other to complete a pressure seal within said conduit with a minimum overlap of adjacent sprays upstream of said pressure seal.

30. A method for cooling water comprising the steps of forming a water spray and directing said spray at high velocity in a generally horizontal direction into one end of a horizontally extending conduit open at both ends to the atmosphere to aspirate air into the conduit and extract heat therefrom inside the conduit, the spray being shaped and configured such that it fills the conduit cross section to produce an air pumping action and a water seal across the conduit thereby to prevent blow back of air therefrom while maintaining a high relative velocity between the injected water and the induced air, said water velocity being sufficiently high that the spray impinges on mist eliminator means located downstream of the thus-formed water seal and separating the sprayed water from the aspirated air while maintaining a high relative velocity between the water and the air by increasing the relative gravity component of the water trajectory as it impinges on said mist eliminator means and channeling the water, whose relative gravity component is thus-increased to flow down along the mist eliminator means and into a water container located below the mist eliminator means which means extend downwardly toward said container while allowing the aspirated air to pass through said mist eliminator means out from said conduit to the atmosphere.

31. An evaporative heat exchange comprising an injector having means defining a rectangular air intake opening, an intermediate region, a region of expansion downstream of said intermediate region, means defining an exhaust opening, means to spray water in a given direction into said intermediate region to induce air flow in said given direction into said intake opening and to flow concurrent with said water through said intermediate region and region of expansion along generally horizontal axes, means to collect the sprayed water, the expansion downstream of said intermediate region being in the upper and lower wall portions thereof, said water spray means comprising a plurality of spaced apart nozzles so constructed and arranged as to discharge oval section spray jets having their wider surfaces normal to said upper and lower wall portions, said nozzles being positioned such that adjacent jets therefrom touch each other downstream of said nozzles as they move in said given direction, said jets being positioned and arranged by said nozzles to present streamlined profiles to air entering said intake opening and to permit said entering air to flow in between the jets so that a large surface area is presented to air surrounding each jet thereby to induce maximum air flow through said injector and to mix with said jets.

32. An evaporative heat exchanger as claimed in claim 31 wherein the divergence from the horizontal of said upper wall portion of said region of expansion is less than that of the lower wall thereof.

33. An evaporative heat exchanger comprising means defining a venturi, the cross section of which is long in comparison to its width, means to eject a plurality of spaced apart fan-shaped, oval section spray jets of water into said venturi, the flat sides of said spray jets being normal to the axis of the long dimension of the venturi, said spray jets being positioned and arranged to present streamlined profiles to air entering said venturi and to permit said entering air to flow in between the spray jets so that a large surface area is presented to air surrounding each jet thereby to induce maximum air flow through said venturi, a water container for receiving the output of said venturi and an air venting stack connected to said water container.

34. An evaporative heat exchanger comprising an injector having means defining an air intake opening, an intermediate region, a region downstream of said intermediate region, means defining an exhaust opening, means to spray water into said intermediate region to induce air flow into said intake opening and flow concurrent with said water through said intermediate and downstream regions, means to supply water to be cooled to said spray means, means to collect the sprayed water, a blowdown water conduit connected to said water supply means, a waste water discharge and means to flow waste water from said blowdown water conduit to said waste water discharge in heat exchange relation with at least a part of the means defining the air intake opening.

35. An evaporative heat exchanger as claimed in claim 34 in which the axis of flow through said injector is generally horizontal and the air intake opening is rectangular, wherein the lower defining edge of said rectangular opening is the part of the means defining said air intake opening which is in heat exchange relation with the waste water flowing from said blowdown water conduit to said waste water discharge.

36. An evaporative heat exchanger comprising two injectors positioned one above the other, each having means defining an air intake opening, an intermediate region, a region downstream of said intermediate region and an air exhaust opening, means to spray water into each of said intermediate regions to induce air flow into the respective intake opening, through the respective intermediate and downstream regions to the respective exhaust opening along a generally horizontal axis, means to collect spray water from the upper injector, means to collect spray water from the lower injector, means for discharging water from the lower injector spray water collecting means and means to discharge water collected in the collecting means of the upper injector directly into the collecting means of the lower one.

37. An evaporative heat exchanger comprising an injector having means defining an air intake opening, a throat, opposite wall means defining a region of expansion downstream of said throat, means defining an exhaust opening, means to spray water in a given direction into said throat to induce air flow in said given direction into said opening and to flow concurrent with said water through said throat and downstream region, means to collect the sprayed water, said means to spray water including a plurality of spaced apart nozzles, each of which produces a spray jet divergent from the nozzle but substantially flat on opposite sides, said nozzles being positioned such that the adjacent jets therefrom touch each other downstream of said nozzles, as they move in said given direction, said jets being positioned and arranged by said nozzles to present streamlined profiles to air entering said opening and to permit said entering air to flow in between the jets so that a large surface area is presented to air surrounding each jet thereby to induce maximum air flow through said injector and to mix with said jets, said nozzles being so oriented that the surfaces of the spray jets which diverge do so in the same general direction as said opposite wall means which define the region of downstream expansion.

38. An evaporative heat exchanger comprising an injector having means defining a rectangular air intake opening an intermediate region, a region downstream of said intermediate region, means defining an exhaust opening, a row of nozzles distributed across said air intake opening, means to spray water from said nozzles to induce air flow into said intake opening and flow concurrent with said water through said intermediate and downstream regions, a gutter constituting at least that extent of the lower portion of the means defining said air intake opening which lies beneath said nozzles, said air intake opening and said exhaust opening both being open to to atmosphere, said gutter being in gravity registry with the drip from said nozzles when said means to spray is shut off and means to drain said gutter.

39. An evaporative heat exchanger as claimed in claim 38 in which guide means are located between the nozzles and the gutter to direct drippage from the nozzles into said gutter.

* * * * *

UNITED STATES PATENT OFFICE
CERTIFICATE OF CORRECTION

Patent No. 3,807,145          Dated April 30, 1974

Inventor(s) JOHN ENGALITCHEFF, JR., WILSON E. BRADLEY, JR., and EDWARD N. SCHINNER It is certified that error appears in the above-identified patent and that said Letters Patent are hereby corrected as shown below:

Title page, No. [73], "Aircool" to read --Aircoil--;

Claim 1, column 8, line 61 - "psaced" is misspelled and should be --spaced--;

Claim 10, column 9, line 45 - "whrein" is misspelled and should be --wherein--;

Claim 21, column 10, line 57 - the word "conduit" should be deleted and the word --injector-- inserted therein.

Claim 21, column 10, line 60 - the word "conduit" should be deleted and the word --injector-- inserted therein.

claim 38, column 14, line 35 - a --,-- should be inserted between "opening" and "an".

Signed and sealed this 17th day of September 1974.

(SEAL)
Attest:

McCOY M. GIBSON JR.
Attesting Officer

C. MARSHALL DANN
Commissioner of Patents